R. H. MANSON.
ELECTRIC SYSTEM FOR VEHICLES.
APPLICATION FILED APR. 10, 1912.
1,215,676.
Patented Feb. 13, 1917.
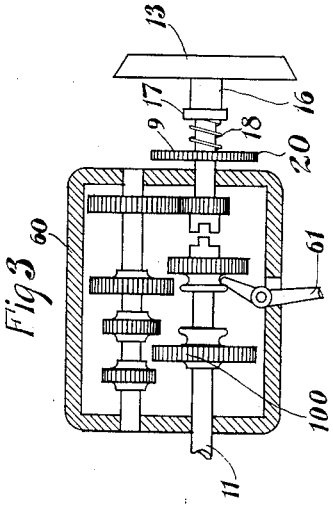
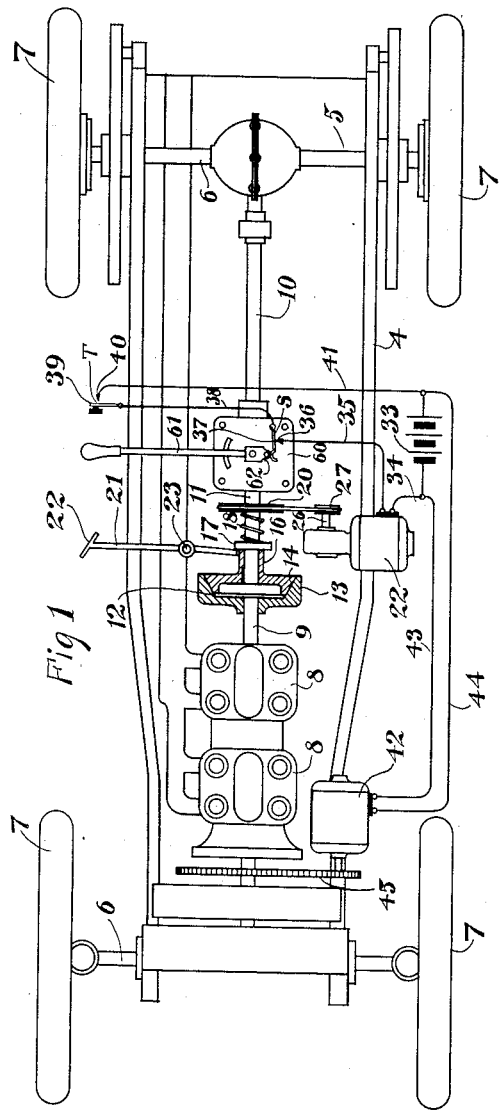
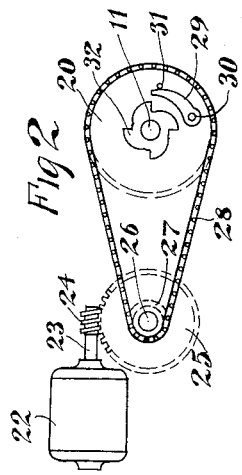
Witnesses
Inventor
Ray H. Manson
By J. O. Richey
His Attorney

UNITED STATES PATENT OFFICE.

RAY H. MANSON, OF ELYRIA, OHIO, ASSIGNOR TO THE GARFORD MANUFACTURING COMPANY, OF ELYRIA, OHIO, A CORPORATION OF OHIO.

ELECTRIC SYSTEM FOR VEHICLES.

1,215,676.  Specification of Letters Patent.  Patented Feb. 13, 1917.

Application filed April 10, 1912. Serial No. 689,727.

*To all whom it may concern:*

Be it known that I, RAY H. MANSON, a citizen of the United States, residing at Elyria, in the county of Lorain and State of Ohio, have invented certain new and useful Improvements in Electric Systems for Vehicles; and I do hereby declare the following to be a full, clear, and exact description of the invention, such as will enable others skilled in the art to which it appertains to make and use the same.

My invention relates to electric systems for use upon vehicles, such as automobiles, and more particularly to a system for starting the prime mover of the automobile. This prime mover may consist of an explosion engine of a desired number of cylinders. I aim to overcome certain defects which are now met with in such systems, as well as to produce a new system.

The apparatus employed in the particular embodiment of my invention illustrated, the invention itself and the objects thereof will be best understood by the particular description taken in connection with the accompanying drawing, describing and illustrating one particular embodiment of my invention.

Figure 1 is a plan view of the chassis of an automobile in connection with which I have shown a circuit in diagram illustrating an embodiment of my invention.

Figs. 2 and 3 are details.

Referring now to the drawing and to the particular embodiment of my invention there illustrated, at 4 is shown the chassis of a vehicle, such as an automobile, and at 5 the running gear, which includes the axles 6 and the wheels 7. At 8 I show a prime mover, which here consists of an explosion engine whose pistons are connected to a crank shaft 9. The prime mover is adapted to be connected to the running gear through suitable mechanism, such for example as a driving shaft 10 and an intermediate device, here shown as a shaft 11. Suitable means are provided for connecting the members 9 and 11 together. I here show a clutch 12 which should be such a clutch as will permit the members 9 and 11 to be connected and disconnected when one is stationary and the other moving, or when they are moving at different speeds, without any sudden jar or jerk to the mechanism. I have found a friction clutch suitable for this purpose, and have illustrated such, though I do not wish to be limited thereto. This clutch consists of two members, such as 13 mounted upon the member 9, and 14, mounted upon the member 11. When the friction surfaces of these members engage, the members 9 and 11 will be clutched together as illustrated in Fig. 1. The member 13 is fast upon the shaft 9 and the member 14 is keyed to shaft 11, but slidable thereon, being connected through a boss 16 with a collar 17. The member 14 is normally in engagement with the member 13 and is kept there by some suitable means, such as a spring 18. In the form shown, a coil spring is employed, abutting at one end against the collar 17 and at the other end against a wheel 20, which is to be referred to. I provide a device for sliding the member 14 out of engagement with the member 13, which is here shown as a clutch lever 21 adapted to be operated by the foot through a foot pedal 22. This lever may be pivoted at 23, as shown, and when operated, compresses the spring 18, shoving back the clutch member 14, and disengaging the crank shaft from the intermediate member 11. At 22 I show means for starting the engine, which is preferably an electric motor. This motor is connected to the prime mover to start the same through some suitable means, such as shafts and gearing. In the form illustrated, a worm 24 is mounted upon the motor shaft 23 and meshes with a worm 25 mounted upon a shaft 26, which also carries a sprocket wheel 27. A sprocket chain 28 engages this wheel, and the wheel 20 mounted to rotate loosely upon a shaft 11. A pawl 29 is connected by suitable means 30 to the wheel 20 and rotates therewith, a pin 31 being employed to hold the pawl in the desired position. A ratchet wheel 32 is fastened upon the member 11 close to the wheel 20 and is adapted to be engaged by the pawl 29 when it is desired to rotate the member 11. At 33 I show a storage battery which may be mounted upon the vehicle in any suitable position, and which is connected to one terminal of the motor through a conductor 34. The other terminal of the motor is connected through a conductor 35 to one contact 36 of an electric switch S, the other contact 37 of which is connected by a conductor 38 to one terminal 39 of a second switch T. The other terminal 40 of the switch T is connected by a conductor 41 to the battery 33. Any form of switch may be used at T, though I prefer to use a push button switch and to mount it in an automobile in such a way as will be most convenient to the operator. I may charge the storage battery 33 in any suitable manner, though I prefer to employ a dynamo 42 which is connected to the battery through conductors 43 and 44. The dynamo is also connected by some suitable means, such as sprocket wheels and chain 45 to the engine 8, and is driven thereby. This battery may also be used for performing other functions in connection with the vehicle.

The members 10 and 11 are normally disconnected, and suitable mechanism, such as gears 100 are provided for connecting these members together at different ratios, in order that the engine may drive the running gear at different speeds and at different powers. These gears are housed in the casing 60 and are adapted to be operated by some suitable means, such as a lever 61. The lever is shown in Fig. 1 in a neutral position, in which position the members 10 and 11 are disconnected from each other. This lever also controls the switch S through any suitable means, such as a lug 62 on the bottom of the lever. In the form shown, the switch S is open except when the lever is in neutral position, thus making it impossible to connect the motor when in operative condition to the running gear of the vehicle, thus effectively preventing the driving of the vehicle by the motor and preventing the division of the power of the motor between the running gear and the engine when it is desired to start the engine. It will also be seen that I have provided means for starting the member 11 independently of either the prime mover or the running gear thus enabling me to get both the motor and the member 11 under considerable headway before connecting it to the prime mover.

The apparatus illustrated and the objects of my invention will probably be better understood from a description of the operation of the system. Assuming the automobile to be at rest and it is desired to start the same, it will be first necessary to move the lever 61 to neutral position, disconnecting the prime mover and the running gear. When moved to this position, the switch S in the motor circuit will be closed. The foot pedal 21 is then operated to retract the clutch member 14, disconnecting the member 11 from the engine. The switch T is then operated, closing the motor circuit, whereupon the motor is started and through the gearing, starts the sprocket wheel 22. The pawl 29 will drop by force of gravity into one of the ratchet teeth of the ratchet wheel 32, which is fast to the shafting 11, whereupon this shafting will begin to rotate. When the shafting has attained considerable velocity, the pressure upon the foot pedal is released, and the members 13 and 14 engage, clutching the member 11 to the shaft 9 and to the engine. The motor thus begins to operate the engine, which in a little while will operate under its own power, increasing the speed of the shaft, whereupon the ratchet wheel 32 will run away from the pawl 29, so that the engine will operate at a higher speed than the motor. The switch T is then opened, breaking the motor circuit which ceases to operate. The lever 61 may then be operated to connect the prime mover to the running gear as desired.

Although I have shown this particular connecting means for connecting the motor to the prime mover, it will be understood that any suitable means may be employed. I likewise contemplate the employment of any suitable type of motor and dynamo, and may charge the battery in any suitable manner. I have also shown the circuit S controlled by the member 61 in this particular way, though any suitable means for controlling this circuit may be employed. In fact, I contemplate many variations within the scope of the appended claims.

It will likewise be obvious to those skilled in the art that numerous and extensive departures from the forms and details of the apparatus here shown may be made without departing from the spirit of this invention, the same being herein shown solely for the purpose of illustrating one specific embodiment thereof.

I claim:

1. In combination with the running gear of a vehicle, of a prime mover adapted to be connected to such gear, means controlling the connection of such prime mover to such gear, a starting motor for the prime mover, and a circuit for said motor, two switches in series in said circuit, one of which is controlled by said means.

2. In combination with the running gear of a vehicle, a prime mover adapted to be connected therewith, a starting motor for said prime mover, a circuit for said motor, a plurality of switches in series in said circuit, and means controlling the connection of said prime mover to said running gear and one of said switches.

3. In combination with the running gear of a vehicle, a prime mover, means for transmitting motion from said prime mover to said gear, said means being normally connected to said prime mover, means for disconnecting said prime mover and said transmission means, and a starting motor for said prime mover adapted to be connected to said transmission means to operate the same, without operating either the gear or the prime mover, said transmission means being independent of said motor.

4. In combination with the running gear of a vehicle, a prime mover, transmission means for transmitting power from said prime mover to said gear, a clutch normally operating to connect said prime mover to said means, but adapted to be operated to disconnect said elements, means to disconnect said means and said gear, and a starting motor independent of said transmission means adapted to be connected to said means when said means is disconnected from said prime mover and said gear.

5. In combination with the running gear of a vehicle, a prime mover, transmission means for transmitting power from said prime mover to said gear, mechanism for disconnecting said means from said gear and said prime mover, and a starting motor for starting said prime mover normally disconnected from said transmission means, but adapted to be connected to said means when said means is disconnected from said gear and said prime mover.

6. In combination with the running gear of a vehicle, a prime mover, transmission means for transmitting power from said prime mover to said gear, mechanism for disconnecting said means from said gear and said prime mover, a starting motor for starting said prime mover normally disconnected from said transmission means, and means for connecting said starting motor to said transmission means when the latter is disconnected from the prime mover and the gear.

7. In combination with the running gear of a vehicle, a prime mover, transmission means for transmitting power from said prime mover to said running gear adapted to be connected to each, a friction clutch for connecting said prime mover to said transmission means, a device for disengaging said clutch, and an electric starting motor operative when said transmission means is disconnected from said running gear to start said transmission means independent of said prime mover and running gear said clutch adapted to connect said prime mover and transmission means after the latter is started whereby said prime mover is started by the motor.

In testimony whereof, I affix my signature in the presence of two witnesses.

RAY H. MANSON.

Witnesses:
   D. A. GLOVER,
   F. O. RICHEY.